US010769270B2

(12) United States Patent
Wen

(10) Patent No.: US 10,769,270 B2
(45) Date of Patent: Sep. 8, 2020

(54) PASSWORD PROTECTION QUESTION SETTING METHOD AND DEVICE

(71) Applicant: Alibaba Group Holding Limited, Grand Cayman (KY)

(72) Inventor: Tao Wen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 23 days.

(21) Appl. No.: 15/465,494

(22) Filed: Mar. 21, 2017

(65) Prior Publication Data

US 2017/0193217 A1 Jul. 6, 2017

Related U.S. Application Data

(63) Continuation of application No. PCT/CN2015/089107, filed on Sep. 8, 2015.

(30) Foreign Application Priority Data

Sep. 22, 2014 (CN) .......................... 2014 1 0487036

(51) Int. Cl.
*H04L 29/06* (2006.01)
*G06F 21/46* (2013.01)
*G06F 16/28* (2019.01)

(52) U.S. Cl.
CPC ............ *G06F 21/46* (2013.01); *G06F 16/284* (2019.01); *G06F 2221/2131* (2013.01)

(58) Field of Classification Search
CPC ............... G06F 21/46; G06F 17/30595; G06F 2221/2131

(Continued)

(56) References Cited

U.S. PATENT DOCUMENTS 9,411,950 B1 * 8/2016 Olsen-Kreusch ....... G06F 21/36
2005/0039057 A1 2/2005 Bagga et al.
(Continued)

FOREIGN PATENT DOCUMENTS

CN 102035649 4/2011
CN 102316205 1/2012
(Continued)

OTHER PUBLICATIONS

Extended European Search Report dated Feb. 23, 2018 for European patent application No. 15843862.2, 7 pages.
First Office Action dated Sep. 28, 2017 by the State Intellectual Property Office of the People's Republic of China in co-pending Application No. CN 201410487036.7, with English-language translation (11 pages).
(Continued)

*Primary Examiner* — Evans Desrosiers
(74) *Attorney, Agent, or Firm* — Lee & Hayes, P.C.

(57) ABSTRACT

A method and an apparatus for setting a password protection question are disclosed. The method includes: receiving a password protection question set request for a password, the set request including a user identifier; extracting one or more pieces of setting information corresponding to the user identifier; individually acquiring one or more password protection questions that match the one or more pieces of setting information; and outputting the one or more password protection questions. The embodiments of the present disclosure can output password protection questions related to preference or interest of a user when the user sets a password protection question, which reinforces the impression of the user on the password protection question, thereby reducing situations that the user forgets the set password protection question and an answer thereof, and improving the practicability of the password protection question.

18 Claims, 6 Drawing Sheets

(58) Field of Classification Search
USPC .......................................................... 726/18
See application file for complete search history.

(56) References Cited

U.S. PATENT DOCUMENTS

| | | | |
|---|---|---|---|
| 2009/0089876 A1 | 4/2009 | Finamore et al. | |
| 2009/0288150 A1 | 11/2009 | Toomim et al. | |
| 2010/0122341 A1 | 5/2010 | Golle et al. | |
| 2011/0117882 A1* | 5/2011 | Luu ....................... | H04L 63/083 455/410 |
| 2011/0191838 A1 | 8/2011 | Yanagihara | |
| 2013/0173556 A1* | 7/2013 | Grigg .................. | H04L 67/1095 707/667 |
| 2014/0259130 A1* | 9/2014 | Li .......................... | G06F 21/31 726/6 |
| 2015/0186632 A1* | 7/2015 | Liu ....................... | H04L 63/08 726/7 |

FOREIGN PATENT DOCUMENTS

| | | |
|---|---|---|
| CN | 102833613 A | 12/2012 |
| CN | 103944737 | 7/2014 |
| JP | 2008269054 A | 11/2008 |
| JP | 2010061329 A | 3/2010 |
| WO | 9746933 A1 | 12/1997 |

OTHER PUBLICATIONS

Translation of International Search Report from corresponding PCT application No. PCT/CN2015/089107 dated Dec. 2, 2015, 2 pages.
Translation of Written Opinion from corresponding PCT application No. PCT/CN2015/089107 dated Dec. 2, 2015, 6 pages.
Japanese Office Action dated Apr. 2, 2019 for Japanese Patent Application No. 2017-515789, a counterpart of U.S. Appl. No. 15/465,494, 11 pages.
English translation of the Japanese Office Action dated Apr. 2, 2019 for Japanese Patent Application No. 2017-515789, a counterpart of U.S. Appl. No. 15/465,494, 11 pages.
English translation of the Korean Office Action dated Jul. 9, 2019 for Korean Patent Application No. 2017-7007165, a counterpart of U.S. Appl. No. 15/465,494, 8 pages.
The Korean Office Action dated Jan. 16, 2020 for Korean Patent Application No. 2017-7007165, a of U.S. Appl. No. 15/465,494, 4 pages.
Machine translation (Eng.) of the Second Chinese Office Action dated Apr. 23, 2018 for Chinese Patent Application 201410487036.7, a counterpart foreign application of U.S. Appl. No. 15/465,494, 11 pages.
The Japanese Office Action dated Jan. 28, 2020 for Japanese Patent Application No. 2017-515789, a of U.S. Appl. No. 15/465,494, 8 pages.

* cited by examiner

PASSWORD PROTECTION QUESTION SETTING METHOD AND DEVICE

CROSS REFERENCE TO RELATED PATENT APPLICATIONS

This application claims priority to and is a continuation of PCT Patent Application No. PCT/CN2015/089107, filed on 8 Sep. 2015, and which claims priority to Chinese Patent Application No. 201410487036.7 filed on 22 Sep. 2014, entitled "Password Protection Question Setting Method and Device," which are hereby incorporated by reference in their entirety.

TECHNICAL FIELD

The present disclosure relates to the field of security technologies, and in particular, to methods and apparatuses for setting a password protection question.

BACKGROUND

Along with the development of the Internet, the number of platforms having different service functions has increased. For example, a platform may provide portal websites, instant messaging tools, and the like. These platforms provide convenience for people in lives and work.

Generally, a user may register an account on a platform, and set up a corresponding password to ensure the security of the account. The user may accept a service provided by the platform using the account and the password. For example, the user can log into an instant messaging tool using the account and the password to conduct instant messaging with another user.

After setting up the password, a situation that the user forgets the password or the password is stolen may easily happen, such that the account cannot be used anymore. Moreover, user information in the account may occupy a large amount of storage resources. Therefore, in order to reduce user churn and resource occupation caused by the loss of user passwords, the platform may conduct security authentication on an identity of a user through a password protection question.

When a user needs to modify a password, a platform requires the user to answer a password protection question. When the answer is correct, the user is allowed to reset the password.

Currently, for password protection questions, a platform generally provides a number of password protection questions for a user to choose randomly, and the user sets corresponding answers to the password protection questions.

Since password protection questions are infrequently used by a user after setting, the user easily forgets respective answers set thereby. When needed, the user may not be able to answer a password protection question correctly, so that a password cannot be retrieved.

Therefore, a technical problem urgently to be solved by one skilled in the art is how to provide a mechanism for setting up a password protection question, to improve the practicability of the password protection question and to reduce the occupation of storage resources by useless user information.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In implementations, the present disclosure provides a method for setting a password protection question to improve the practicability of the password protection question and to reduce the occupation of storage resources by useless user information.

Correspondingly, the present disclosure further provides an apparatus for setting a password protection question to improve the practicability of the password protection question and to reduce the occupation of storage resources by useless user information.

In order to solve the above problems, the present disclosure discloses a method for setting password protection question. In implementations, the method may include receiving a password protection question set request for a password, the set request including a user identifier; extracting one or more pieces of setting information corresponding to the user identifier; acquiring one or more password protection questions that separately match the one or more pieces of setting information; and outputting the one or more password protection questions.

In implementations, the setting information includes preference information, and the setting information is obtained by acquiring behavior information corresponding to the user identifier and learning the preference information from the behavior information.

In implementations, extracting the one or more pieces of setting information corresponding to the user identifier may include extracting one or more pieces of preset setting information corresponding to the user identifier from a preset database.

In implementations, acquiring the one or more password protection questions that separately match the one or more pieces of setting information may include searching a preset question bank for one or more password protection questions including the one or more pieces of setting information.

In implementations, acquiring the one or more password protection questions that separately match the one or more pieces of setting information respectively may include searching a preset question bank for one or more password protection questions having a semantic meaning that is the same as the one or more pieces of setting information, where each protection question has corresponding category information; and determining whether the one or more pieces of setting information match with the category information individually, and extracting the password protection question if affirmative.

In implementations, acquiring the one or more password protection questions that separately match the one or more pieces of setting information may include generating the one or more password protection questions using the one or more pieces of setting information.

In implementations, the method may further include receiving one or more first answers for the one or more password protection questions; and individually establishing association relationships between the one or more password protection questions and the one or more first answers.

In implementations, the method may further include outputting one or more password protection questions corresponding to the password in response to receiving a modification request for the password; receiving one or more second answers for the one or more password protection questions; and configuring a permission of modifying the password when the one or more second answers are identical to the one or more first answers associated with the one or more password protection questions.

To solve the aforementioned problems, the present disclosure further discloses an apparatus for setting a password protection question. In implementations, the apparatus may include a set request receiving module configured to receive a password protection question set request for a password, the set request including a user identifier; a setting information extraction module configured to extract one or more pieces of setting information corresponding to the user identifier; a password protection question acquisition module configured to acquire one or more password protection questions that separately match the one or more pieces of setting information; and a first password protection question output module configured to output the one or more password protection questions.

In implementations, the setting information includes preference information, and the setting information may be obtained by acquiring behavior information corresponding to the user identifier and learning the preference information from the behavior information.

In implementations, the setting information extraction module may include a database extraction sub-module configured to extract one or more pieces of preset setting information corresponding to the user identifier from a preset database.

In implementations, the password protection question acquisition module may include a first search sub-module configured to search a preset question bank for one or more password protection questions including the one or more pieces of setting information.

In implementations, the password protection question acquisition module may include a second search sub-module configured to search a preset question bank for one or more password protection questions having a semantic meaning that is identical to the one or more pieces of setting information, where each protection question has corresponding category information; a matching determination sub-module configured to separately determine whether the one or more pieces of setting information match the category information, and invoke a password protection question extraction sub-module if affirmative; and the password protection question extraction sub-module configured to extract the password protection question.

In implementations, the password protection question acquisition module may include a password protection question generation sub-module configured to generate the one or more password protection questions using the one or more pieces of setting information.

In implementations, the apparatus may further include a first answer receiving module configured to receive one or more first answers for the one or more password protection questions; and an association relationship establishment module configured to individually establish association relationships between the one or more password protection questions and the one or more first answers.

In implementations, the apparatus may further include a second password protection question output module configured to output the one or more password protection questions corresponding to the password in response to receiving a modification request for the password; a second answer receiving module configured to receive one or more second answers for the one or more password protection questions; and a permission configuration module configured to configure a permission of modifying the password when the one or more second answers are the same as the one or more first answers associated with the one or more password protection questions.

Compared with existing technologies, the embodiments of the present disclosure have the following advantages:

For a request of setting password protection question(s), the disclosed method and apparatus acquire one or more password protection questions that separately match one or more pieces of setting information through an extraction of the one or more pieces of setting information corresponding to a user identifier. As the setting information can represent preference or interest of a user to some extent, password protection questions related to the preference or interest of the user may be outputted to the user when setting up the password protection questions. Therefore, the impression of the user on the password protection questions is reinforced, and occasions in which the user forgets the set password protection questions and answers thereof are reduced, thus improving the practicability of the password protection questions.

For a request of modifying a password, the disclosed method and apparatus output a password protection question corresponding to the password, and allow the password to be modified when a second answer to the password protection question is the same as a first answer. As the password protection question may be configured according to the preference or interest of the user, the user can easily answer the password protection question to reclaim the ownership of an associated account, thus greatly improving the convenience of operations for password protection, reducing the occurrence of useless user information, and thereby reducing the occupation of storage resources by the useless user information.

DETAILED DESCRIPTION

To make the above objectives, features and advantages of the present disclosure in a more apparent and comprehensible manner, the present disclosure is further described in detail hereinafter in conjunction with the accompanying drawings and specific implementations.

In the Internet world, various types of information of a user is generally represented by a specific set of data, and various types of network systems need to identify a digital identity of the user to confirm an offer of a corresponding permission of operation. At the initial stage of development of the Internet industry, a password is a core element for a network system to identify a legal digital identity owner and operator (i.e., ensuring a physical identity of the operator to correspond to a digital identity thereof) in a network.

After the Internet industry developed to a new level, a digital identity of a user in a network is prone to intercepting and capturing by lawbreakers using Trojan viruses and hacker programs due to openness and interconnectivity of a computer system, thus damaging various interests of the user.

Accordingly, a network system needs a strengthened password method or product to ensure that a physical identity of a user is consistent with a digital identity thereof, and password protection thus emerges.

The password protection may refer to a security product that records a user identity and is responsible for identifying the user identity.

A password protection question may be applied to security protection of an account password in a form of an answer and a question. As a password protection question generally includes personal private information of a user, such as a name of a class teacher in a junior middle school, a spouse's birthday, a student number in a university, etc., a respective answer is generally known only by the user who sets thereof, and is a reliable password protection.

Figure 1:
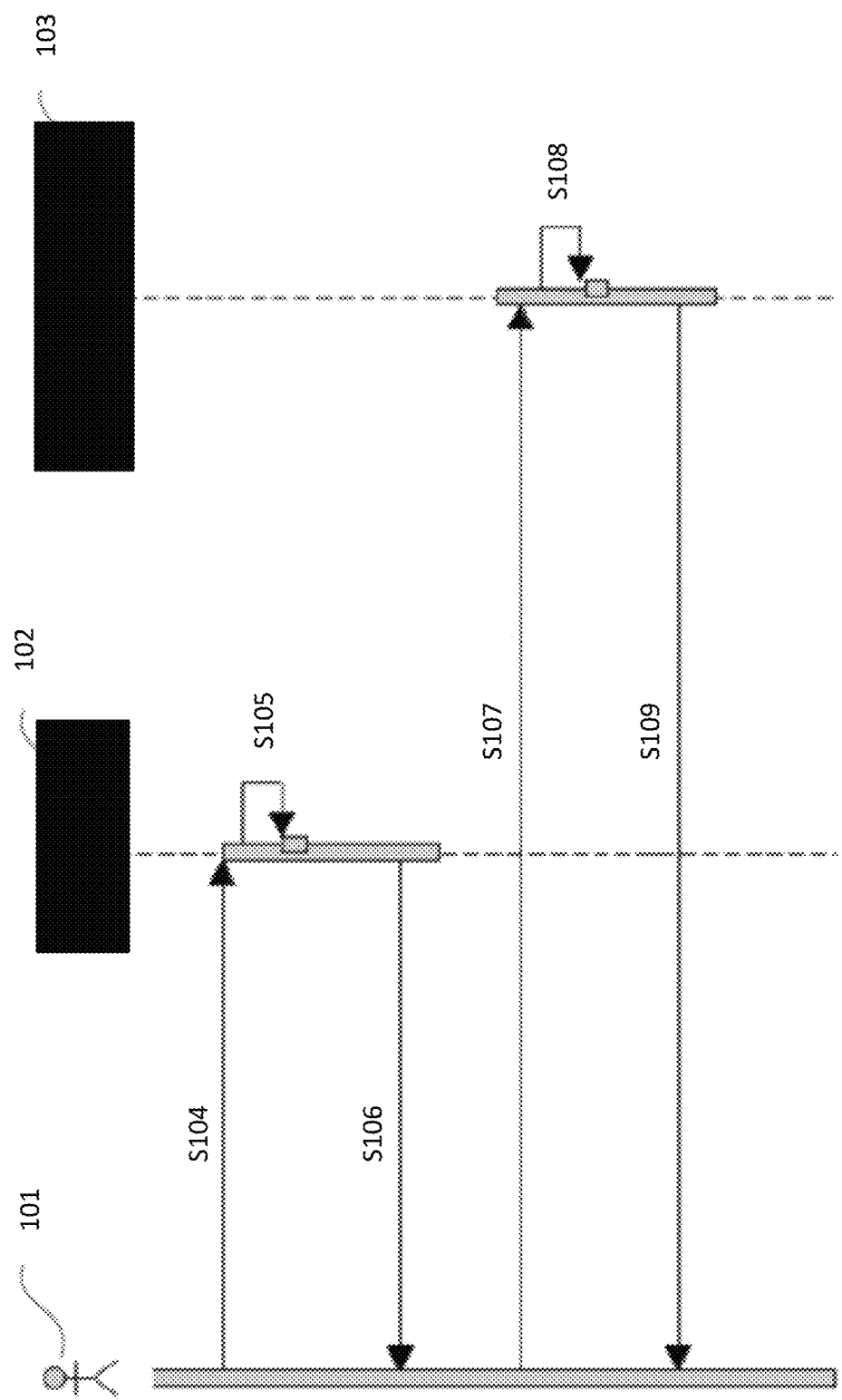
FIG. 1 is a schematic diagram of setting a conventional password protection question.

FIG. 1 shows a schematic diagram of setting a conventional password protection question.

In a scenario when password protection 102 (for example, a password protection question) is set as shown in FIG. 1, a user 101 may send request for setting up password protection question(s) to a service platform at S104. The service platform may randomly select three password protection questions for a user 101 to configure at S105, and return a message indicating successful configuration at S106, such that the service platform can store the password protection questions and corresponding answers.

In a situation such as when a password is forgotten or stolen, a scenario 103, in which a password is needed, is entered. The user 101 may send a request for modifying the password to the service platform at S107, and the service platform may retrieve the three preset password protection questions, and wait for the user to answer at S108.

Since a password protection question is generally used only in some special scenarios (for example, resetting a password) and a probability of using thereof is relatively low, a respective answer is easily forgotten by the user 101. Even the password protection question itself may also be easily forgotten by the user 101, and the user 101 generally cannot provide the correct answer. Therefore, the service platform generally returns a message indicating an incorrect answer to the password protection question at S109. As such, the user 101 is not able to modify the password.

Password protection questions that are set according to traditional methods cannot protect a password well, and are poor in practicability. Therefore, one of core concepts of the embodiments of the present disclosure is proposed. A password protection question close to the preference or interest of a user is associated based on the preference or interest of the user. The impression of the user on the password protection question may be strengthened, and ensures that a correct answer may be provided when the password protection question is needed, such that the password protection question can play a role of password protection in reality.

Figure 2:
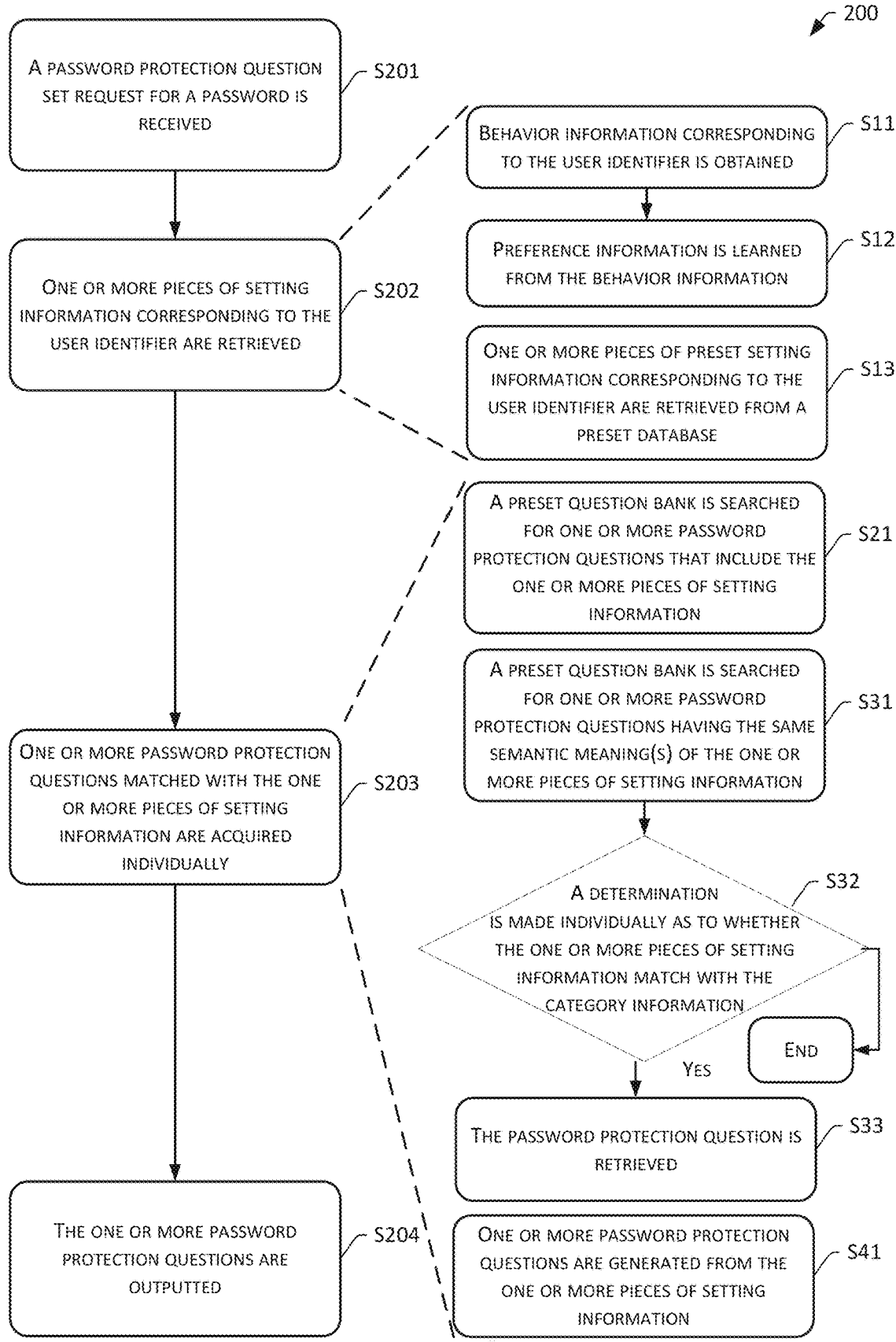
FIG. 2 is a flowchart of a first exemplary password protection question setting method according to the present disclosure.

FIG. 2 shows a flowchart of a first exemplary password protection question setting method 200 according to the present disclosure. Details thereof include the operations as follows.

S201: A password protection question set request for a password is received.

In a real application, the password protection question set request may be an instruction sent by a user for setting up password protection question(s) for a certain password.

For example, the user may submit the password protection question set request in a designated webpage, submit a password protection question set request through a designated control of an application, or submit the password protection question set request in other manners.

It should be noted that the password protected by the password protection question(s) may be at least one of an account password or an individual password.

An account password may be a password for logging into a user account. An individual password may be a password for protecting certain service object(s) after the user account is logged in.

For example, an individual password may be a password of viewing a chatting record in an instant messaging tool, a password for logging into an associated mailbox, a password for confirming a payment, or a protection password for processing (such as trading, destroying, etc.) a virtual goods, etc., which is not limited in the embodiments of the present disclosure.

In implementations, the set request may include a user identifier. A user identifier may represent information that can determine a user, which may specifically include a user account, user information associated with the user account (another user account, a mailbox, a telephone number, and a title), an Internet Protocol (IP) address of the user, a COOKIE ID, and the like.

S202: One or more pieces of setting information corresponding to the user identifier are retrieved.

Setting information may be information representing preference or interest of a user corresponding to the user identifier that is set in a database to some extent.

In implementations, the setting information may include preference information, and the setting information may be acquired by an approach as follows.

S11: Behavior information corresponding to the user identifier is obtained.

S12: Preference information is learned from the behavior information.

Behavior information may be information recording operation behaviors of the user, and may include operation behaviors on the Internet such as shopping, browsing webpages, and playing streaming media, etc., and may also include local operation behaviors such as playing games, browsing electronic books, and playing audios/videos, etc.

In implementations, preference information of the user may be acquired by learning the behavior information of the user. The preference information may be information identifying the preference/interest of the user.

For example, if behavior information about shopping of a certain user is analyzed, the user purchased 100 pieces of clothes, which include 75 pieces of one-piece dresses, 10 pieces of shirts, 10 pieces of fleeces, and 5 pieces of dust coats. The frequency of purchasing one-piece dresses is relatively high, and therefore, preference information of the user may be learned as "clothes: one-piece dress".

The embodiments of the present disclosure may learn the preference information of the user offline in advance, and store the preference information in a database for direct retrieval when needed.

Apparently, the embodiments of the present disclosure may also learn the preference information of the user online, which is not limited in the embodiments of the present disclosure.

In implementations, S202 may further include the following operation.

S13: One or more pieces of preset setting information corresponding to the user identifier are retrieved from a preset database.

Using the embodiments of the present disclosure, the user may configure some options in scenarios such as a website and a communications tool in advance, for example, configuring personal data, subscribed information, etc., which is stored in a database.

Certain pieces of setting information may represent the preference or interest of the user to some extent.

For example, options such as "a favorite star", "a favorite color", and "a city most desired to go" generally exist in personal data.

For another example, when subscribing information, the user may choose to subscribe a football club, a comic book, information (such as news, talk shows, etc.) of a topic (such as military, beauty, and food).

After configuration is completed, the setting information may be stored in the database and associated with the user identifier.

For example, a user whose user account is "123456" may set "a favorite star" as "Zhang San" and the "a city most desired to go" as "Beijing" on a website, and subscribe information of the Beijing Football Club. A record as shown in the following table may therefore be stored in the database.

| User Account | Favorite Star | City most desired to go | Subscribed information |
|---|---|---|---|
| 123456 | Zhang San | Beijing | Beijing Football Club |

In implementations, one or more pieces of setting information that represent the preference or interest and are associated with the user identifier may be searched from the database, and the one or more pieces of setting information are retrieved.

S203: One or more password protection questions matched with the one or more pieces of setting information are acquired individually.

In implementations, acquisition of one or more password protection questions that match the one or more pieces of setting information representing preference or interest can reinforce the impression of the user on the password protection questions.

In implementations, S203 may further include the following operations.

S21: A preset question bank is searched for one or more password protection questions that include the one or more pieces of setting information.

Using the embodiments of the present disclosure, a question bank may be set up in advance, and the question bank includes a number of basic password protection questions, for example, "Where do you like to go most?", "Who is your favorite star?", and the like.

In implementations, a comparison may be made as to whether a password protection question in the question bank includes setting information, and the password protection question is retrieved if affirmative.

For example, from the setting information of the user whose user account is "123456" that is found by querying the database, "a favorite star" of the user is "Zhang San". The question bank is searched for password protection question(s) having a header that includes "favorite star" based on the character string "favorite star". When a comparison is made to a password protection question "Who is your favorite star?", the password protection question is found to include the character string of "favorite star" also. As such, "Who is your favorite star?" is used as a password protection question of the current user.

In implementations, S203 may further include the following operations:

S31: A preset question bank is searched for one or more password protection questions having the same semantic meaning(s) of the one or more pieces of setting information.

S32: A determination is made individually as to whether the one or more pieces of setting information match with the category information. S33 is performed if affirmative.

S33: The password protection question is retrieved.

Using the embodiments of the present disclosure, a question bank may be set up in advance. The question bank includes a number of basic password protection questions, and each protection question may have corresponding category information. For example, a category of a password protection question "Where do you like to go most?" is geography, and a category of a password protection question "Who is your favorite star?" is entertainment, etc.

In implementations, in situations such as no password protection question being found to in the question bank include the setting information, a password protection question having the same semantic meaning of the setting information may be searched for, and a determination is made as to whether the setting information matches category information of the password protection question. If affirmative, the password protection question is extracted.

In implementations, a degree of semantic similarity between preference information and a password protection question may be calculated. If the degree of semantic similarity exceeds a similarity threshold, the preference information and the password protection question may be considered to have the same semantic meaning.

Two types of approaches for calculating a degree of semantic similarity mainly exist. One type of approach is to organize concepts of related terms into a tree structure through semantic dictionar(ies) for calculation. Another type of approach is to obtain a solution using a statistical method through context information of term.

For example, from among the setting information of the user whose user account is "123456" that is found from querying the database, the "city most desired to go" for the user is "Beijing". A password protection question of which a header includes "city most desired to go" is not found by querying the question bank according to the character string "city most desired to go". When a comparison is made to a password protection question "Where do you want to go most?", the password protection question is found to have a semantic meaning that is identical to "city most desired to go". A category of "Where do you want to go most?" is geography, and "city most desired to go" also belongs to the category of geography. Therefore, "Where do you want to go most?" may be retrieved as a password protection question for the current user.

In implementations, S203 may further include the following operation:

S41: One or more password protection questions are generated from the one or more pieces of setting information.

In implementations, in situations such no password protection question that includes the setting information or no password protection question having the same semantic meaning of the setting information is found in the question bank, a password protection question may be generated using the setting information.

For example, from the setting information of the user whose user account is "123456" that is found by querying the database, information subscribed by the user is "Beijing Football Club". By querying the question bank according to the character string "Beijing Football Club", a password protection question of which a header includes "city most desired to go" is not found, nor can a password protection question having the same semantic meaning of "Beijing Football Club" be found. A character string "football club" in "Beijing Football Club" of the setting information may be extracted, and added with character strings "like most" and "which", to generate a password protection question of "Which football club do you like most?".

For another example, for preference information, "clothes: one-piece dress" indicates that a category the user likes is one-piece dress in clothes. The character string "clothes" is extracted and added with character strings "like most" and "what", to generate a password protection question "What clothes do you like most?".

It should be noted that different categories of setting information may have different generation rules, and one skilled in the art may perform configurations according to actual situations.

S204: The one or more password protection questions are outputted.

In implementations, the password protection questions may be outputted to an object in which the password protection question set request is submitted for display, to allow the user to select and set corresponding answers.

For example, if the user submits the password protection question set request in a designated webpage, the one or more password protection questions may be outputted to the designated webpage for display. If the user submits the password protection question set request through a designated control of an application, the one or more password protection questions may be outputted to a designated interface in the application for display. If the user submits the password protection question set request in other manners, the password protection question may be outputted to a corresponding object for display.

By retrieving one or more pieces of setting information corresponding to a user identifier for a password protection question set request, the embodiments of the present disclosure acquires one or more password protection questions that individually match the one or more pieces of setting information. As the setting information can represent preference or interest of the user to some extent, a password protection question related to the preference or interest of the user may be outputted when the user sets the password protection question, which reinforces the impression of the user on the password protection question, thereby reducing occasions that the user forgets the set password protection question and a answer thereof, and improving the practicability of the password protection question.

Figure 3:
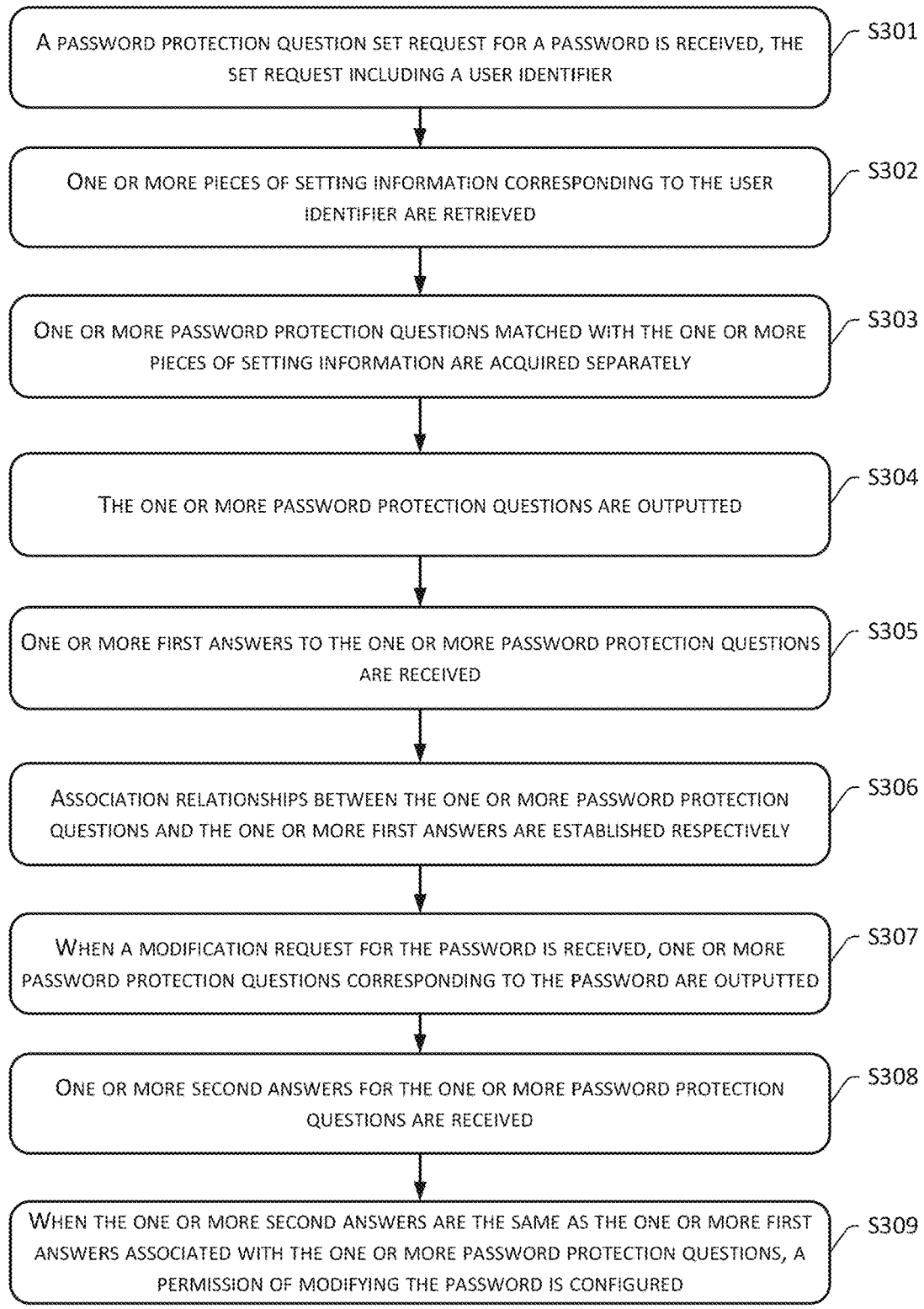
FIG. 3 is a flowchart of a second exemplary password protection question setting method according to the present disclosure.

FIG. 3 shows a flowchart of a second exemplary password protection question setting method 300 according to the present disclosure. Details thereof may specifically include the following operations.

S301: A password protection question set request for a password is received, the set request including a user identifier.

S302: One or more pieces of setting information corresponding to the user identifier are retrieved.

S303: One or more password protection questions matched with the one or more pieces of setting information are acquired separately.

S304: The one or more password protection questions are outputted.

S305: One or more first answers to the one or more password protection questions are received.

S306: Association relationships between the one or more password protection questions and the one or more first answers are established respectively.

In implementations, the user may set first answer(s) for all or some of the password protection questions that are outputted. The first answer(s) is/are received at the backend, and association relationship(s) between the first answer(s) and respective password protection question(s) is/are established and stored in a database, for verifying identity information in situations such as password reset.

For example, three password protection questions are provided to the user whose user account is "123456", namely, "Who is your favorite star?", "Where do you want to go most?", and "Which football club do you like most?". The user sets corresponding answers for all of them, that is, "Zhang San", "Beijing", and "Beijing Football Club", and association relationships therebetween as shown in the following table may be established:

| Password Protection Question | First Answer |
| --- | --- |
| Who is your favorite star? | Zhang San |
| Where do you want to go most? | Beijing |
| Which football club do you like most? | Beijing Football Club |

S307: When a modification request for the password is received, one or more password protection questions corresponding to the password are outputted.

S308: One or more second answers for the one or more password protection questions are received.

S309: When the one or more second answers are the same as the one or more first answers associated with the one or more password protection questions, a permission of modifying the password is configured.

In implementations, the password modification request may refer to an instruction from the user to modify a password.

In situations such as a password being forgotten or the password being stolen, a user may send a request for modifying the password to reset the password. At this point, an identity of the current user needs to be verified to determine whether the user is a legitimate owner who owns a digital identity to which the password belongs. If verification thereof is successful, a determination is made that the current user has the permission of modifying the password, and the user is allowed to modify the password.

For example, a current user sends a request for modifying a password associated with a user account "123456". A database may then be searched for one or more password protection questions corresponding to the password of the user account "123456", and the one or more password protection questions are outputted for display, as shown in the following table:

|  |  | Answer |
| --- | --- | --- |
| Question 1 | Who is your favorite star? | Zhang San |
| Question 2 | Where do you want to go most? | Beijing |
| Question 3 | Which football club do you like most? | Beijing Football Club |

If the user enters second answers "Zhang San", "Beijing", and "Beijing Football Club" respectively in an answer column as shown in the above table, the current user is allowed to modify the password upon determining that the second answers are the same as the first answers associated with the password protection questions.

For a password modification request, the embodiments of the present disclosure output password protection question(s) corresponding to a password and allow the password to be modified in response to second answer(s) for the password protection question(s) is/are the same as first answer(s). As a password protection question may be set according to preference or interest of a user, the user can easily answer the password protection question to reclaim the ownership of an associated account, thus greatly improving the convenience of operations of password protection, reduce the occurrence of useless user information, and thereby reducing the occupation of storage resources by the useless user information.

To enable one skilled in the art to better understand the embodiments of the present disclosure, the password protection question setting methods in the embodiments of the present disclosure are described hereinafter through specific examples.

Figure 4:
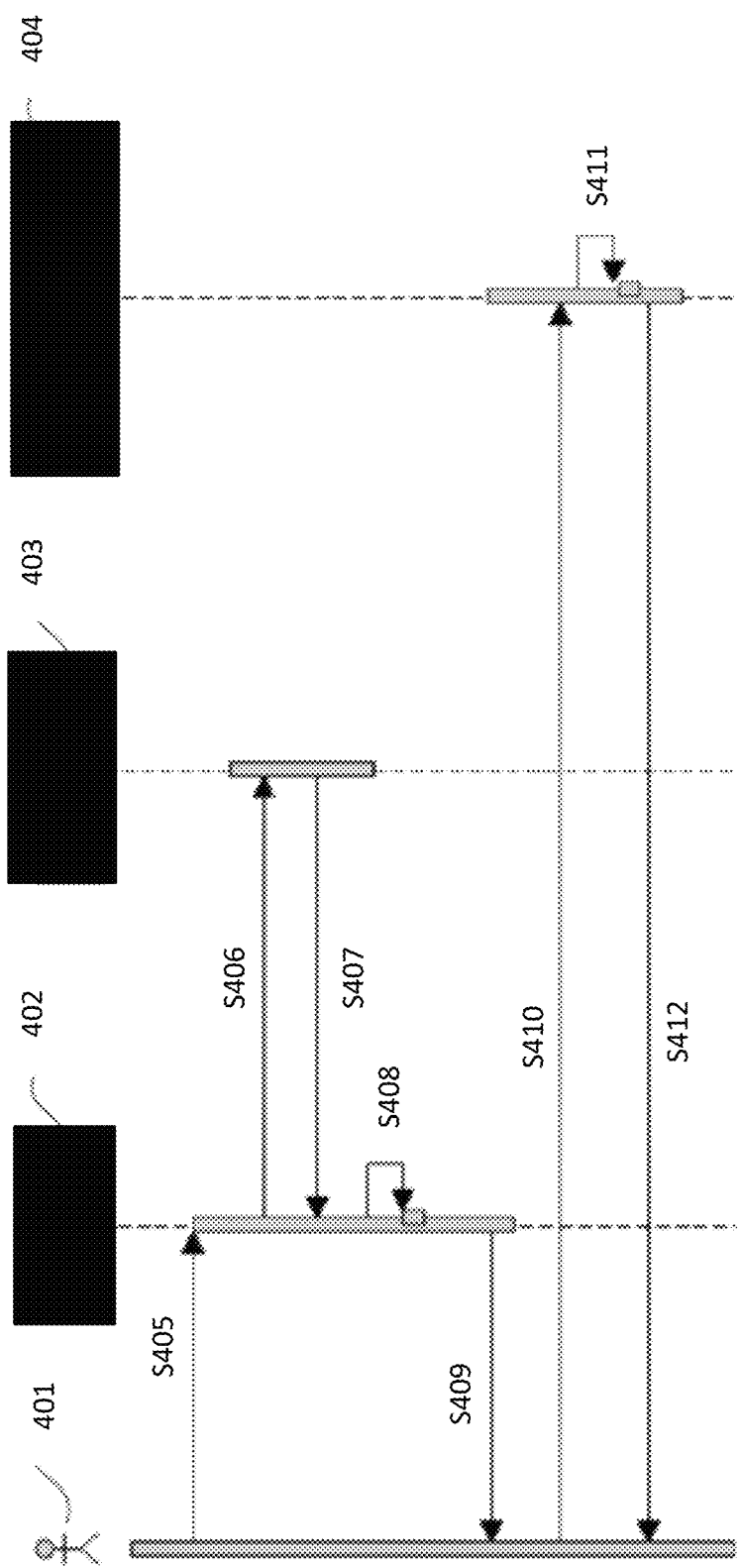
FIG. 4 is a schematic diagram of a password protection question setting method according to the present disclosure.

FIG. 4 shows a schematic diagram of setting a password protection question according to the present disclosure.

As shown in 4, in a scenario where password protection 402 (for example, a password protection question) is set, a user 401 may send a password protection question set request to a service platform at S405. The service platform may select three password protection questions according to setting information that represents preference or interest 403 of the user at S406, and return the three password protection questions at S407. The three password protection questions are displayed at S408 for the user 401 to configure. After configuration is successful, a message indicating a successful configuration is returned at S409, such that the service platform can establish an association relationship between the password protection question and a corresponding answer, and store the association relationship in a database.

In a situation such as a password being forgotten or the password being stolen, a scenario 404 in which a password is needed is entered. The user 401 may send a modification request of the password to the service platform at S410. The service platform may retrieve the three preset password protection questions, and wait for the user to answer at S411.

As the password protection questions are questions that are set according to the preference or interest of the user and related to the user's own information, the answers thereof are not easily forgotten by the user 101 even though they are rarely used. The user can easily provide the correct answers. Therefore, the service platform generally returns a message indicating that answers to the password protection questions are correct at S412, to allow the user 401 to modify the password.

In this example, a password protection question close to the preference or interest of the user is associated according to the preference or interest of the user, the impression of the user on the password protection question may be strengthened, to ensure that a correct answer may be provided when the password protection question is needed, such that the password protection question can play an actual role of password protection.

It should be noted that the method embodiments are described as a series of combinations of actions for the ease of description. One skilled in the art should know, however, that the embodiments of the present disclosure are not limited to the orders of actions described herein, because certain operations may be performed in other orders or in parallel according to the embodiments of the present disclosure. Furthermore, one skilled in the art should know that the embodiments described in the specification are all exemplary embodiments, and actions involved therein may not be essential for the embodiments of the present disclosure.

Figure 5:
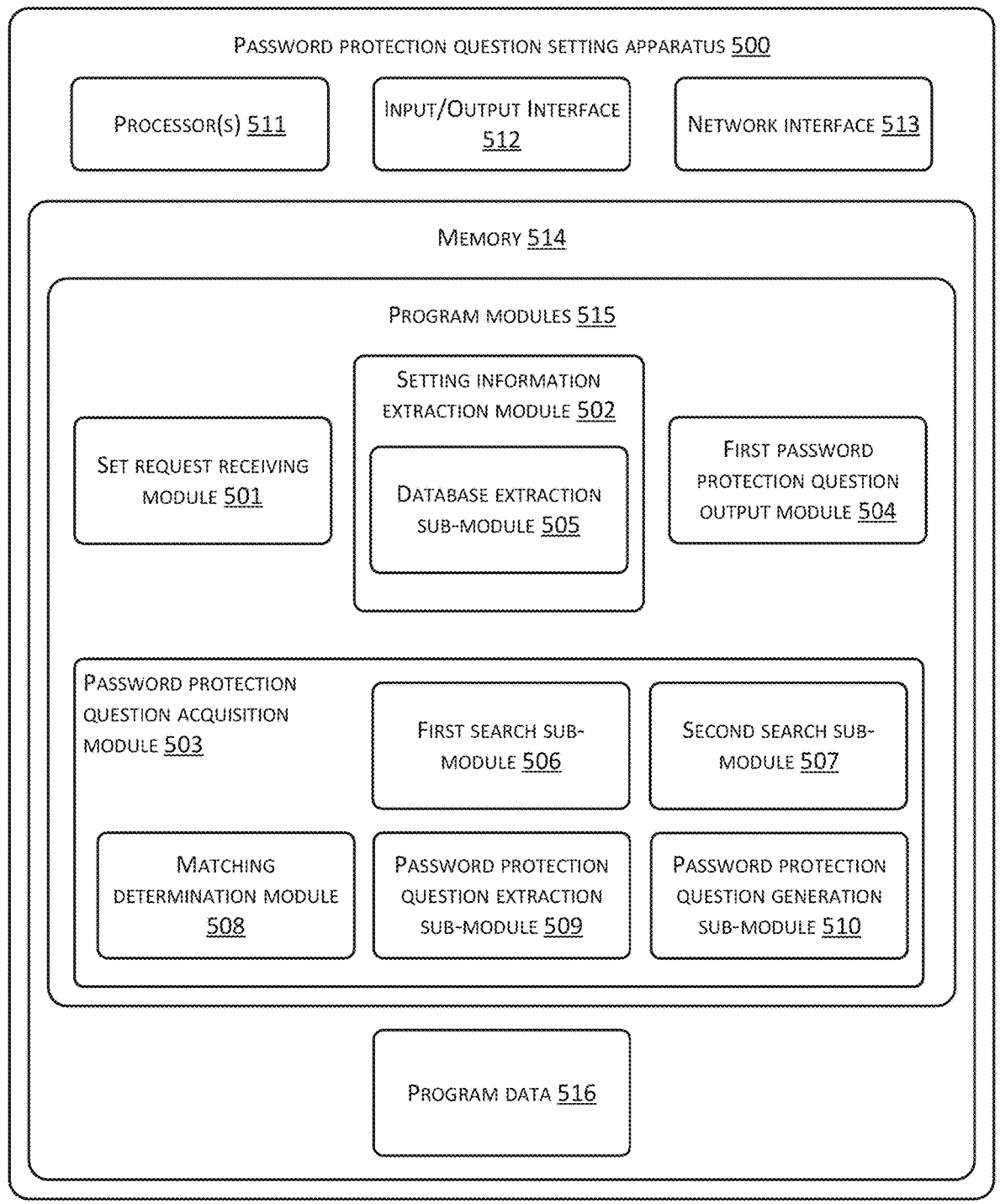
FIG. 5 is a structural block diagram of a first exemplary password protection question setting apparatus according to the present disclosure.

FIG. 5 shows a structural block diagram of a first exemplary password protection question setting apparatus 500 according to the present disclosure. In implementations, the apparatus 500 may include one or more computing devices. By way of example and not limitations, in an implementation, the apparatus 500 may include a set request receiving module 501 configured to receive a password protection question set request for a password, the set request including a user identifier; a setting information extraction module 502 configured to extract one or more pieces of setting information corresponding to the user identifier; a password protection question acquisition module 503 configured to acquire one or more password protection questions separately matched with the one or more pieces of setting information; and a first password protection question output module 504 configured to output the one or more password protection questions.

In implementations, the setting information may include preference information, and the setting information may be acquired by acquiring behavior information corresponding to the user identifier and learning the preference information from the behavior information.

In implementations, the setting information extraction module 502 may include a database extraction sub-module 505 configured to retrieve one or more pieces of preset setting information corresponding to the user identifier from a preset database.

In implementations, the password protection question acquisition module 503 may include a first search sub-module 506 configured to search a preset question bank for one or more password protection questions that includes the one or more pieces of setting information.

In implementations, the password protection question acquisition module 503 may include a second search sub-module 507 configured to search a preset question bank for one or more password protection questions having respective semantic meanings identical to the one or more pieces of setting information, wherein each protection question has corresponding category information; a matching determination sub-module 508 configured to individually determine whether the one or more pieces of setting information match the category information; and invoke a password protection question extraction sub-module if affirmative; and the password protection question extraction sub-module 509 configured to retrieve the password protection questions.

In implementations, the password protection question acquisition module 503 may include a password protection question generation sub-module 510 configured to generate one or more password protection questions using the one or more pieces of setting information.

In implementations, the apparatus 500 may further include one or more processors 511, an input/output (I/O) interface 512, a network interface 513, and memory 514.

The memory 514 may include a form of computer-readable media, e.g., a non-permanent storage device, random-access memory (RAM) and/or a nonvolatile internal storage, such as read-only memory (ROM) or flash RAM. The memory 514 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 514 may include program modules 515 and program data 516. In implementations, the program modules 515 may include one or more of the foregoing modules.

Figure 6:
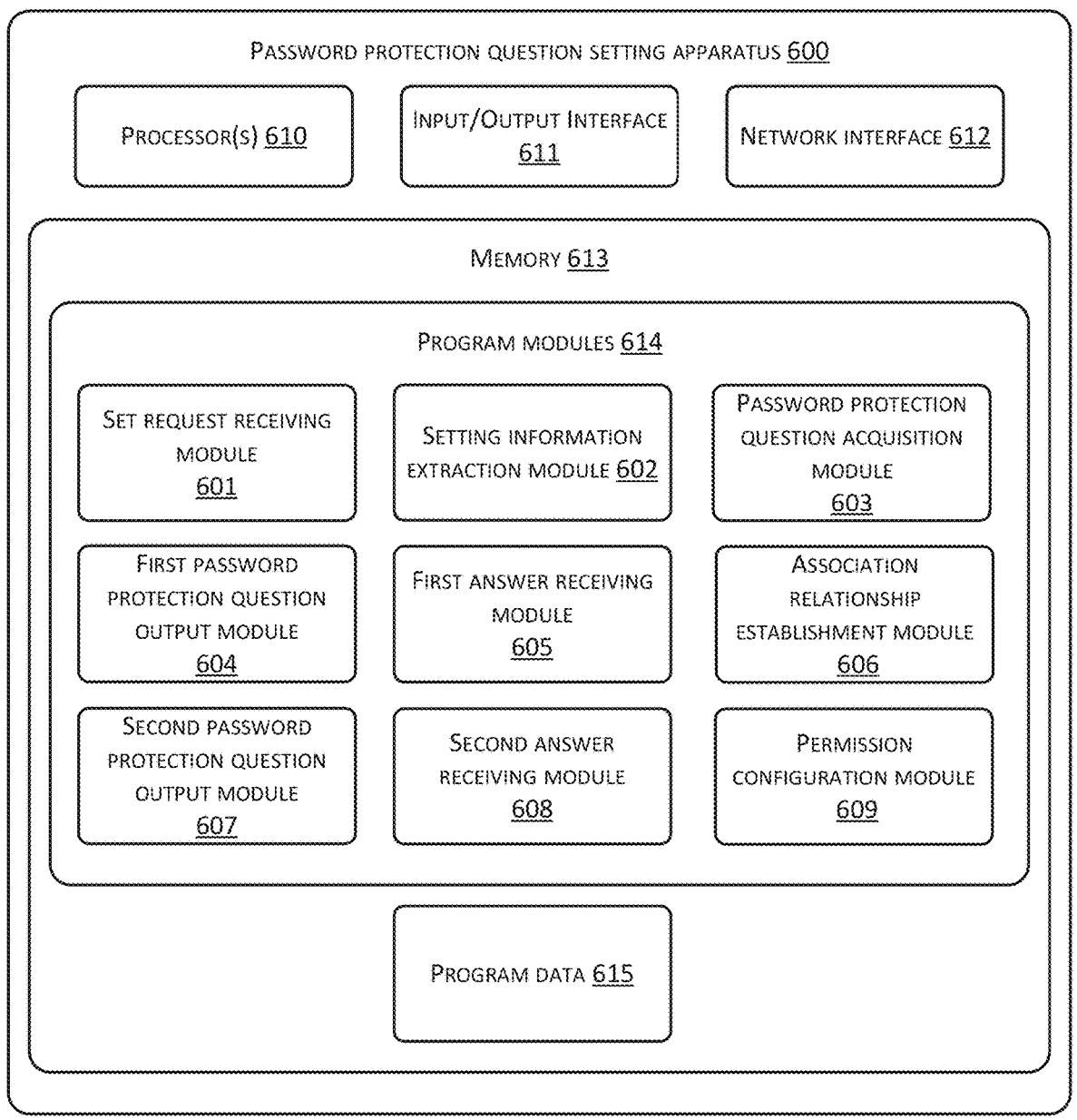
FIG. 6 is a structural block diagram of a second exemplary password protection question setting apparatus according to the present disclosure.

FIG. 6 shows a structural block diagram a second exemplary password protection question setting apparatus 600 according to the present disclosure. In implementations, the apparatus 600 may include one or more computing devices. By way of example and not limitations, in an implementation, the apparatus 600 may include a set request receiving module 601 configured to receive a password protection question set request for a password, the set request including a user identifier; a setting information extraction module 602 configured to extract one or more pieces of setting information corresponding to the user identifier; a password protection question acquisition module 603 configured to acquire one or more password protection questions individually matched with the one or more pieces of setting information; a first password protection question output module 604 configured to output the one or more password protection questions; a first answer receiving module 605 configured to receive one or more first answers to the one or more password protection questions; an association relationship establishment module 606 configured to establish respective association relationships between the one or more password protection questions and the one or more first answers; a second password protection question output module 607 configured to output the one or more password protection questions corresponding to the password in response to receiving a modification request for the password; a second answer receiving module 608 configured to receive one or more second answers to the one or more password protection questions; and a permission configuration module 609 configured to set up a permission of modifying the password when the one or more second answers are identical to the one or more first answers associated with the one or more password protection questions.

In implementations, the apparatus 600 may further include one or more processors 610, an input/output (I/O) interface 611, a network interface 612, and memory 613.

The memory 613 may include a form of computer-readable media, e.g., a non-permanent storage device, random-access memory (RAM) and/or a nonvolatile internal storage, such as read-only memory (ROM) or flash RAM. The memory 613 is an example of computer-readable media as described in the foregoing description.

In implementations, the memory 613 may include program modules 614 and program data 615. In implementations, the program modules 614 may include one or more of the foregoing modules.

Since the apparatus embodiments are basically similar to the method embodiments, a description thereof is relatively simple. Related portions can be referenced to the descriptions of respective portions in the method embodiments.

The embodiments of this specification are all described in a progressive manner. Each embodiment emphasizes an area different from other embodiments. Same or similar parts among the embodiments may be cross-referenced to each other.

One skilled in the art should understand that the embodiments in the embodiments of the present disclosure may be provided as a method, an apparatus, or a computer program product. Therefore, the embodiments of the present disclosure may be implemented as a complete hardware embodiment, a complete software embodiment, or an embodiment that is a combination of software and hardware. Moreover, the embodiments of the present disclosure may be in a form of a computer program product implemented on one or more computer usable storage media (including, but not limited to, a magnetic disk storage, a CD-ROM, an optical storage, etc.) including computer usable program codes.

The embodiments of the present disclosure are described in accordance with flowcharts and/or block diagrams of the exemplary methods, terminal devices (systems) and computer program products of the present disclosure. It should be understood that each process and/or block and combinations of the processes and/or blocks of the flowcharts and/or the block diagrams may be implemented by computer program instructions. Such computer program instructions may be provided to a general purpose computer, a special purpose computer, an embedded processor or other processing device having a programmable data processing terminal device to generate a machine, so that an apparatus having the functions indicated in one or more blocks described in one or more processes of the flowcharts and/or one or more blocks of the block diagrams may be implemented by executing the instructions by the computer or the other processing device having the programmable data processing terminal device.

Such computer program instructions may also be stored in a computer readable memory device which may cause a computer or another programmable data processing terminal device to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing terminal device, so that a series of operations may be executed by the computer or the other data processing terminal device to generate a computer implemented process. Therefore, the instructions executed by the computer or the other programmable terminal device may be used to implement one or more processes of the flowcharts and/or one or more blocks of the block diagrams.

Although exemplary embodiments of the embodiments of the present disclosure have been described, one skilled in the art can make additional variations and modifications to the embodiments upon understanding the basic creative concepts. Therefore, the appended claims are intended to be explained as including the exemplary embodiments and all variations and modifications that fall in the scope of the embodiments of the present disclosure.

Finally, it should be noted that relational terms described herein, such as "first" and "second", etc., are used solely to distinguish one entity or operation from another entity or operation without necessarily requiring or implying any existence of such relationship or ordering between these entities or operations in reality. Moreover, terms such as "comprise", "include" and any other variants thereof are intended to cover a non-exclusive inclusion. A process, method, product or terminal device that includes a series of elements not only includes those elements, but also includes other elements that are not explicitly listed, or further includes elements that already existed in such process, method, product or terminal device. In a condition without further limitations, an element defined by a phrase "include a/an . . . " does not exclude any other similar elements from existing in the process, method, product or terminal device.

The password protection question setting methods and the password protection question setting apparatuses provided by the present disclosure are described in details above. Specific examples are used in the present disclosure illustrating the principles and implementations of the present disclosure. The foregoing embodiments are merely used for facilitating the understanding of the methods of the present disclosure and corresponding core concepts. One of ordinary skill in the art may make changes to the specific implementations and scopes of application based on the concepts of the present disclosure. In view of the above, the content of the present disclosure should not be construed as a limitation to the present disclosure.

The invention claimed is:

1. A method implemented by one or more computing devices, the method comprising:
    receiving a request to set a password protection question for a password, the request comprising a user identifier;
    retrieving one or more pieces of setting information corresponding to the user identifier;
    individually acquiring one or more password protection questions that match the one or more pieces of setting information, the one or more password protection questions not having corresponding answers set thereto; and
    outputting the one or more password protection questions prior to the one or more password protection questions having corresponding answers set thereto;
    wherein individually acquiring the one or more password protection questions that match the one or more pieces of setting information comprises generating the one or more password protection questions by adding information to the one or more pieces of setting information.

2. The method of claim 1, wherein the setting information comprises preference information, and wherein the setting information is acquired by:
    acquiring behavior information corresponding to the user identifier; and
    learning the preference information from the behavior information.

3. The method of claim 1, wherein retrieving the one or more pieces of setting information corresponding to the user identifier comprise retrieving one or more pieces of preset setting information corresponding to the user identifier from a preset database.

4. The method of claim 1, wherein individually acquiring the one or more password protection questions that match the one or more pieces of setting information comprises searching a preset question bank for one or more password protection questions comprising the one or more pieces of setting information.

5. The method of claim 1, wherein individually acquiring the one or more password protection questions that match the one or more pieces of setting information further comprises:
    searching a preset question bank for one or more password protection questions with respective semantic meanings being identical to the one or more pieces of setting information, wherein each protection question has corresponding category information; and
    separately determining whether the one or more pieces of setting information match the category information; and extracting the password protection questions if affirmative.

6. The method of claim 1, further comprising:
    receiving one or more first answers for the one or more password protection questions; and
    establishing respective association relationships between the one or more password protection questions and the one or more first answers.

7. The method of claim 6, further comprising:
    outputting the one or more password protection questions corresponding to the password in response to receiving a modification request for the password;
    receiving one or more second answers for the one or more password protection questions; and
    configuring a permission of modifying the password in response to the one or more second answers being identical to the one or more first answers associated with the one or more password protection questions.

8. An apparatus comprising:
    one or more processors;
    memory;
    a set request receiving instruction stored in the memory and executable by the one or more processors to receive a request to set a password protection question for a password, the request comprising a user identifier;
    a setting information extraction instruction stored in the memory and executable by the one or more processors to retrieve one or more pieces of setting information corresponding to the user identifier;
    a password protection question acquisition instruction stored in the memory and executable by the one or more processors to individually acquire one or more password protection questions that match the one or more pieces of setting information, the one or more password protection questions not having corresponding answers set thereto; and
    a first password protection question output instruction stored in the memory and executable by the one or more processors to output the one or more password protection questions prior to the one or more password protection questions having corresponding answers set thereto;
    wherein the password protection question acquisition instruction comprises a password protection question generation sub-instruction stored in the memory and executable by the one or more processors to generate one or more password protection questions by adding information to the one or more pieces of setting information.

9. The apparatus of claim 8, wherein the setting information comprises preference information, and wherein the setting information is obtained by:
acquiring behavior information corresponding to the user identifier; and
learning the preference information from the behavior information.

10. The apparatus of claim 8, wherein the setting information extraction instruction comprises a database extraction sub-instruction stored in the memory and executable by the one or more processors to retrieve one or more pieces of preset setting information corresponding to the user identifier from a preset database.

11. The apparatus of claim 8, wherein the password protection question acquisition instruction comprises a first search sub-instruction stored in the memory and executable by the one or more processors to search a preset question bank for one or more password protection questions comprising the one or more pieces of setting information.

12. The apparatus of claim 8, wherein the password protection question acquisition instruction comprises:
a second search sub-instruction stored in the memory and executable by the one or more processors to search a preset question bank for one or more password protection questions with respective semantic meanings being identical to the one or more pieces of setting information, wherein each protection question has corresponding category information;
a matching determination sub-instruction stored in the memory and executable by the one or more processors to separately determine whether the one or more pieces of setting information match the category information, and invoke a password protection question extraction sub-instruction if affirmative; and
a password protection question extraction sub-instruction stored in the memory and executable by the one or more processors to retrieve the password protection questions.

13. The apparatus of claim 8, further comprising:
a first answer receiving instruction stored in the memory and executable by the one or more processors to receive one or more first answers for the one or more password protection questions; and
an association relationship establishment instruction stored in the memory and executable by the one or more processors to establish respective association relationships between the one or more password protection questions and the one or more first answers.

14. The apparatus of claim 13, further comprising:
a second password protection question output instruction stored in the memory and executable by the one or more processors to output the one or more password protection questions corresponding to the password in response to receiving a modification request for the password is received;
a second answer receiving instruction stored in the memory and executable by the one or more processors to receive one or more second answers for the one or more password protection questions; and
a permission configuration instruction stored in the memory and executable by the one or more processors to set up a permission of modifying the password in response to the one or more second answers being identical to the one or more first answers associated with the one or more password protection questions.

15. One or more computer-readable media storing executable instructions that, when executed by one or more processors, cause the one or more processors to perform acts comprising:
receiving a request to set a password protection question for a password, the request comprising a user identifier;
retrieving one or more pieces of setting information corresponding to the user identifier;
individually acquiring one or more password protection questions that match the one or more pieces of setting information, the one or more password protection questions not having corresponding answers set thereto; and
outputting the one or more password protection questions prior to the one or more password protection questions having corresponding answers set thereto;
wherein individually acquiring the one or more password protection questions that match the one or more pieces of setting information comprises generating the one or more password protection questions by adding information to the one or more pieces of setting information.

16. The one or more computer-readable media of claim 15, wherein the setting information comprises preference information, and wherein the setting information is acquired by:
acquiring behavior information corresponding to the user identifier; and
learning the preference information from the behavior information.

17. The one or more computer-readable media of claim 15, wherein individually acquiring the one or more password protection questions that match the one or more pieces of setting information comprises at least one of:
searching a preset question bank for a password protection question including at least one of the one or more pieces of setting information; or
searching the preset question bank for a password protection question having a semantic meaning being identical to any one of the one or more pieces of setting information.

18. The one or more computer-readable media of claim 15, the acts further comprising:
receiving one or more first answers for the one or more password protection questions; and
establishing respective association relationships between the one or more password protection questions and the one or more first answers.

* * * * *